United States Patent
Kim et al.

(10) Patent No.: US 8,290,452 B2
(45) Date of Patent: Oct. 16, 2012

(54) RADIO FREQUENCY TRANSMITTER AND SIGNAL AMPLIFICATION METHOD THEREFOR

(75) Inventors: Duk-Yong Kim, Gyeonggi-do (KR); Yeung Jun Kim, Placentia, CA (US); Ik Soo Chang, Gyeonggi-do (KR); Myong-hun Yang, Chino Hills, CA (US); Hang Ho Shin, Yorba Linda, CA (US); Jae Won Kim, Irvine, CA (US)

(73) Assignee: KMW Inc. (KR)

( * ) Notice: Subject to any disclaimer, the term of this patent is extended or adjusted under 35 U.S.C. 154(b) by 52 days.

(21) Appl. No.: 12/939,269

(22) Filed: Nov. 4, 2010

(65) Prior Publication Data

US 2011/0105060 A1    May 5, 2011

Related U.S. Application Data

(60) Provisional application No. 61/258,127, filed on Nov. 4, 2009.

(51) Int. Cl.
*H04B 1/04*    (2006.01)
*H04K 3/00*    (2006.01)

(52) U.S. Cl. .................................. 455/118; 455/119
(58) Field of Classification Search .............. 455/84–86, 455/118–119; 331/40, 182–183
See application file for complete search history.

(56) References Cited

U.S. PATENT DOCUMENTS

| 6,154,641 A * | 11/2000 | Zhang ........................... 455/112 |
| 2002/0079977 A1* | 6/2002 | Sakai .............................. 331/74 |

FOREIGN PATENT DOCUMENTS

| KR | 10-1998-0080801 A | 11/1998 |
| KR | 10-1999-0059043 A | 7/1999 |
| KR | 10-2001-0020004 A | 3/2001 |

OTHER PUBLICATIONS

PCT, Search Report, PCT/KR2010-007777, Jul. 18, 2011.

* cited by examiner

*Primary Examiner* — Lee Nguyen

(57) ABSTRACT

A Radio Frequency (RF) transmitter and a signal amplification method therefor are provided, in which a signal source generates a signal of a predetermined Intermediate Frequency (IF) band, a local oscillator generates a signal of a predetermined high frequency band as a carrier signal, a power amplifier amplifies the signal received from the local oscillator to a predetermined transmission level, and a parametric mixer module receives the signals from the signal source and the power amplifier and outputs the received signals as a radio signal for transmission. The signal output from the parametric mixer module is transmitted as the radio signal without additional amplification.

14 Claims, 4 Drawing Sheets

RADIO FREQUENCY TRANSMITTER AND SIGNAL AMPLIFICATION METHOD THEREFOR

BACKGROUND OF THE INVENTION

1. Field of the Invention

The present invention relates to a Radio Frequency (RF) transmitter suitable for use in a wireless transmission apparatus that transmits a high-power radio signal, such as a wireless communication Base Station (BS), and a signal amplification method therefor.

2. Description of the Related Art

FIG. 1 is an exemplary block diagram of a conventional RF transmitter. Referring to FIG. 1, the conventional RF transmitter includes an Intermediate Frequency (IF) signal source 10 for generating an IF signal in a predetermined frequency band, for example, a 100-MHz modulated IF signal, a first amplifier 11 for amplifying the IF signal received from the IF signal source 10 with a predetermined gain, and a first Band Pass Filter (BPF) 12 for filtering the amplified signal received from the first amplifier 11 in a corresponding IF signal band.

The conventional RF transmitter further includes a Local Oscillator (LO) 18 for generating a signal in a predetermined high frequency band, for example, a 2-GHz high frequency signal and a second amplifier 17 for amplifying the high frequency signal generated from the LO 18 with a predetermined gain.

In addition, the conventional RF transmitter includes a mixer (e.g. a modulator) 13 for generating a signal of an intended frequency by mixing the signals received from the first BPF 12 and the second amplifier 17. The mixer 13 may be configured in one of known mixer technologies. The mixed (converted) signal is provided to a power amplifier 15 via a second BPF 14 for filtering the frequency band of a local oscillation signal.

The transmission-level power amplifier 15 may be configured as a linear high-power amplifier, for amplifying the signal received from the second BPF 14 to an intended transmission level. The power amplifier 15 is driven by a DC power source 152. The signal output from the power amplifier 125 is provided to a third BPF 16. The third BPF 16 generates a final RF signal by filtering a transmission band.

One or more of the first, second and third BPFs 12, 14 and 16 may be omitted in a real circuit configuration of the RF transmitter. The first amplifier 11 and the second amplifier 17 are used to compensate for path loss in transmission lines and signal processing devices that a signal generated from the IF signal source 10 or the LO 18 passes through. In some cases (on the whole), the first and second amplifiers 11 and 17 are not needed.

The power amplifier 15, which amplifies a signal to a transmission level, should be configured to be a high-power amplifier. Considering a Peak-to-Average Power Ratio (PAPR) component that may be included in the IF signal of the IF signal source 10 and Inter-Modulation Distortion (IMD) caused by mixing the IF signal with the local oscillation signal in the mixer 13, the power amplifier 15 should be configured as a linear amplifier, especially a power amplifier having higher performance than needed in theory. For instance, even when a 48-dBm output is required in theory, a power amplifier having a very high performance of 56 dBM is used.

SUMMARY OF THE INVENTION

An aspect of embodiments of the present invention is to address at least the problems and/or disadvantages and to provide at least the advantages described below. Accordingly, an aspect of embodiments of the present invention is to provide a high-efficiency RF transmitter and a signal amplification method therefor.

Another aspect of embodiments of the present invention is to provide an RF transmitter and a signal amplification method therefor, which can reduce fabrication cost remarkably.

In accordance with an embodiment of the present invention, there is provided an RF transmitter, in which a signal source generates a signal of a predetermined Intermediate Frequency (IF) band, a local oscillator generates a signal of a predetermined high frequency band as a carrier signal, a power amplifier amplifies the signal received from the local oscillator to a predetermined transmission level, and a parametric mixer module receives the signals from the signal source and the power amplifier and outputs the received signals as a radio signal for transmission.

In accordance with another embodiment of the present invention, there is provided an RF transmission method in an RF transmitter, in which a signal of a predetermined IF band is generated, a local oscillation signal of a predetermined high frequency band is generated as a carrier signal, the local oscillation signal is amplified to a predetermined transmission level, and the signal of the predetermined IF band is combined with the amplified local oscillation signal and output as a radio signal for transmission, using a parametric mixer.

A signal of the amplified local oscillation signal reflected from the parametric mixer may be fed back into the amplified local oscillation signal.

As is apparent from the above description, the RF transmitters and the signal amplifications methods therefor according to the present invention can be realized with low cost and have high efficiency.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
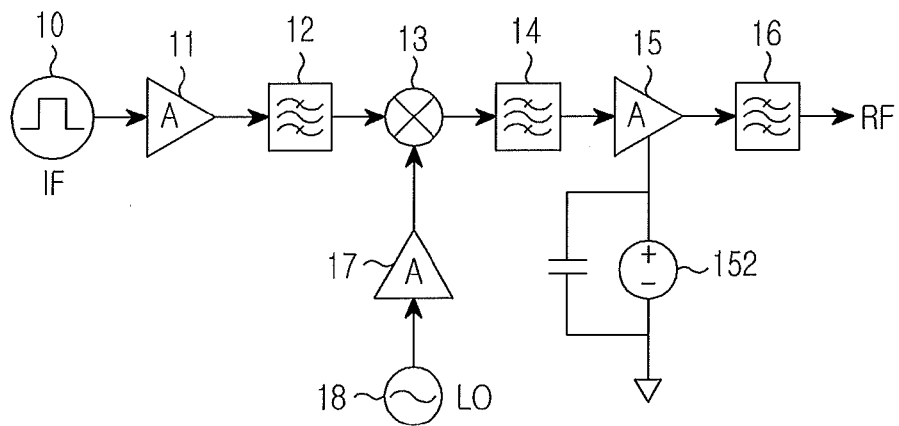
FIG. 1 is an exemplary block diagram of a conventional RF transmitter.

Reference will now be made in detail to the preferred embodiments of the present invention with reference to the accompanying drawings. Like reference numerals denote the same elements across the specification.

Figure 2:
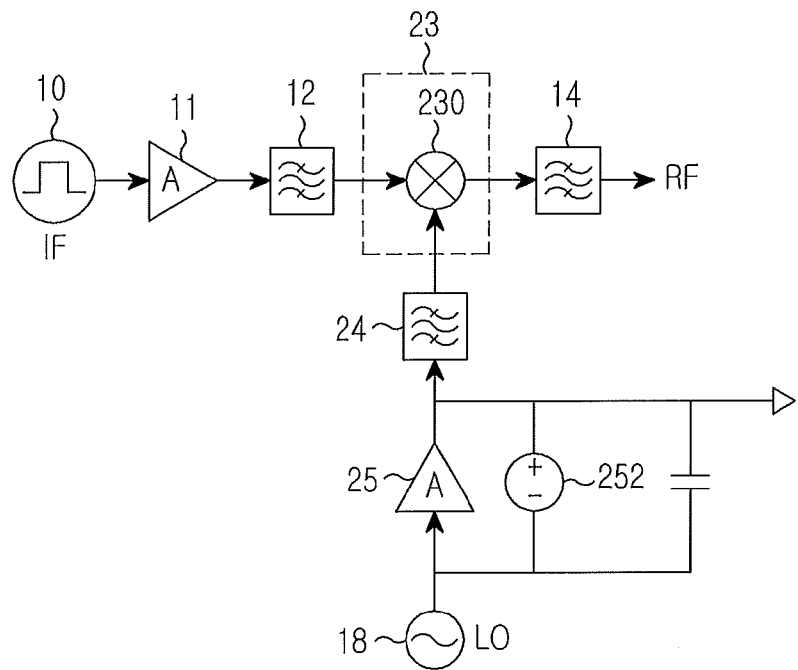
FIG. 2 is a block diagram of an RF transmitter according to an embodiment of the present invention.

FIG. 2 is a block diagram of a high-efficiency Radio Frequency (RF) transmitter according to an embodiment of the present invention. Referring to FIG. 2, the RF transmitter of the present invention having an improved efficiency, compared to a conventional RF transmitter includes the Intermediate Frequency (IF) signal source 10 for generating an IF signal in a predetermined frequency band, for example, a modulated 30- to 300-MHz IF signal, like a conventional IF signal source, the first amplifier 11 for amplifying the IF signal received from the IF signal source 10 with a predetermined gain, and the first Band Pass Filter (BPF) 12 for filtering the amplified signal received from the first amplifier 11 in a corresponding IF band. In addition, the RF transmitter includes the Local Oscillator (LO) 18 for generating a signal in a predetermined high frequency band, for example, a 1- to 3-GHz high frequency signal.

According to the present invention, a power amplifier 25 is connected to the rear end of the LO 18, for amplifying the local oscillation signal received from the LO 18 to an intended transmission level. A DC power source 252 drives the power amplifier 25. The signal output from the power amplifier 25 is provided to a parametric mixer module 23 of the present invention via a second BPF 24 that filters the frequency band of the local oscillation signal.

The parametric mixer module 23 may be configured to include a parametric mixer 230. The parametric mixer module 23 converts the signal received from the first BPF 12 to a signal suitable for wireless transmission according to the signal received from the second BPF 24. The third BPF 14 filters a transmission band from the signal received from the parametric mixer module 23, thereby producing a final RF signal.

One or more of the first, second and third BPFs 12, 24 and 14 may be omitted in a real circuit configuration of the RF transmitter. In addition, the first amplifier 11 may not be needed in some cases (on the whole).

The parametric mixer module 23 will be described in more detail. The parametric mixer (e.g. a parametric upconverter) 230 utilizes non-linear reactance to amplify the signal received from the first BPF 12. The reactance of the parametric mixer 230 may be changed by the local oscillation signal generated from the LO 18 and then amplified (i.e. a pumping signal from the viewpoint of the parametric mixer 230). While the conventional mixer (13 in FIG. 1) is configured with a Schottky diode, the parametric mixer 230 applied to the present invention is configured using a varactor diode. The gain of the parametric mixer 230 may be changed by the IF signal and the local oscillation signal (i.e. the pumping signal).

A major feature of the RF transmitter according to the present invention lies in that the power amplifier 25 amplifies the local oscillation signal received from the LO 18 to an intended transmission level. Since the output of the LO 18 is amplified to a transmission level, efficiency is improved. Especially, the power amplifier is located just behind the LO 18, rather than it amplifies a modulated or mixed signal. Therefore, the power amplifier 25 amplifies a Continuous Wave (CW) pumping signal instead of the conventional modulated or mixed signal. In this manner, the power amplifier 25 can operate as a non-linear amplifier, thereby improving the efficiency of the RF transmitter.

Compared to the conventional RF transmitter, the RF transmitter of the present invention does not need to consider a Peak-to-Average Power ratio (PAPR) that may be included in the IF signal of the IF signal source 11 and IMD caused by a mixture between the IF signal and the local oscillation signal in the mixer 13. Thus the power amplifier 25 has only to amplify the CW local oscillation signal output from the LO 18, thereby enabling realization of a low-power (thus low-cost) power amplifier. Needless to say, the power amplifier 25 may be configured to be a high-power amplifier. In this case, even when a power amplifier of 'class AB' can be designed conventionally, a power amplifier of 'class F' can be designed in the present invention.

Since the parametric mixer 230 has a gain instead of loss caused by the conventional mixer, there is no need for amplifying the output of the parametric mixer 230, thus further increasing the efficiency of the RF transmitter.

Meanwhile, the power of a signal reflected due to impedance matching is very high in the parametric mixer 230. The reflected signal acts as loss and thus the present invention provides a configuration for reusing this reflected signal, which will be described below in detail.

Figure 3:
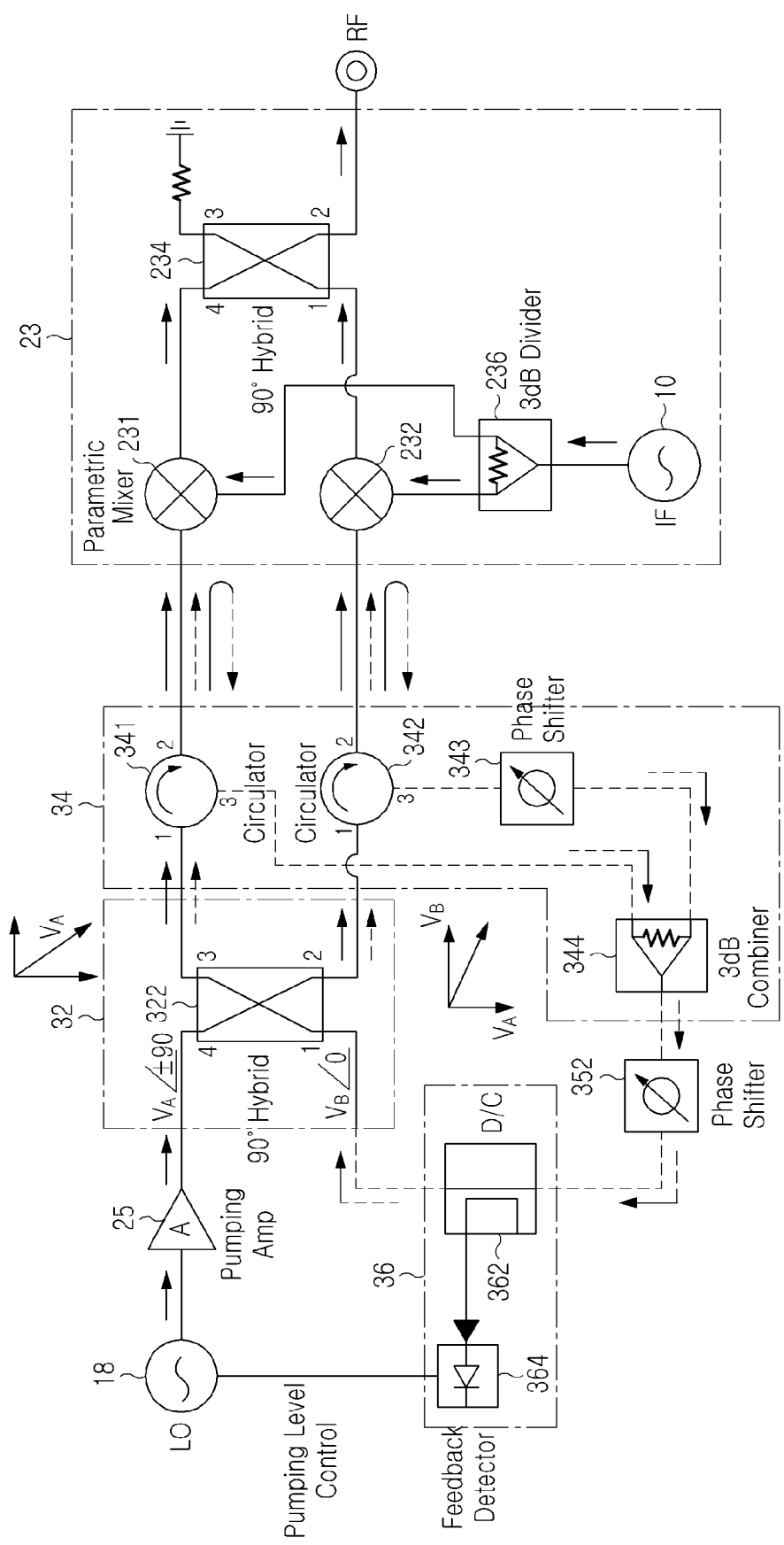
FIG. 3 is a block diagram of an RF transmitter according to another embodiment of the present invention.

FIG. 3 is a block diagram of an RF transmitter according to another embodiment of the present invention. Like the RF transmitter illustrated in FIG. 2, the RF transmitter includes the IF signal source 11, the LO 18, the power amplifier 25 for amplifying a signal received from the LO 18 to an intended transmission level, and the parametric mixer module 23 for converting the signals received from the IF signal source 10 and the power amplifier 25 to a signal suitable for wireless transmission.

In accordance with this embodiment, the RF transmitter includes a plurality of circuit components for reusing a signal reflected from the parametric mixer module 23 on a signal path between the power amplifier 25 and the parametric mixer module 23.

Referring to FIG. 3, a combination/division module 32 for input and reflected signals receives an amplified signal from the power amplifier via a fourth port and receives a signal reflected from the parametric mixer module 23 via a first port, combines and divides the received signals, and outputs the combined and divided signals through second and third ports.

A path formation module 34 for the input and reflected signal forms a path in which the signals received from the second and third ports of the combination/division module 32 are provided to the parametric mixer module 23 and a signal reflected from the parametric mixer module 23 is provided to the first port of the combination/division module 32.

A phase shifter 352 may be provided on a reflected signal path between the path formation module 34 and the combination/division module 32, for matching the phase of the reflected signal to the phase of the signal input to the fourth port of the combination/division module 32. The RF transmitter may further include a signal level control module 36 for detecting the level of the reflected signal or a signal provided to the parametric mixer module 23 and accordingly controlling the output of the LO 18 or the power amplifier 26 to an appropriate level.

The combination/division module 32 may be configured to be a single directional coupler, for example, a hybrid coupler 322. The hybrid coupler 322 divides a signal received from the power amplifier 25 via the fourth port into two signals with a phase difference of 90 degrees and outputs the divided signals via the second and third ports.

The combination/division module 32 divides a reflected signal via the first port into two signals with a phase difference of 90 degrees and outputs the divided signals via the second and third ports.

The path formation module 34 includes a first circulator 341 for receiving a signal from the third port of the hybrid coupler 322 via a first port, outputting the received signal to the parametric mixer module 23 via a second port, receiving a signal reflected from the parametric mixer module 23 via the second port, and outputting the reflected signal via a third port, and a second circulator 342 for receiving a signal from the second port of the hybrid coupler 322 via a first port, outputting the received signal to the parametric mixer module 23 via a second port, receiving a signal reflected from the parametric mixer module 23 via the second port, and outputting the reflected signal via a third port. The path formation module 34 further includes a combiner 344 for combining two signals received from the third ports of the first and second circulators 341 and 342 and a phase shifter 343 installed on one of paths of the two signals output from the third ports of the first and second circulators 341 and 342, for adjusting the signal phase of the installation path in order to match the phases of the two signals.

The parametric mixer module 23 includes a divider 236 for dividing a signal received from the IF signal source 10 into two signals, first and second parametric mixers 231 and 232 for receiving two signals from the path formation module 34, that is, signals from the first and second circulators 341 and 342, and receiving divided signals from the divider 236, and a hybrid coupler 234 being a directional coupler, for receiving the outputs of the first and second parametric mixers 231 and 232 via fourth and first ports, respectively, combining the received signals, and outputting the combined signal via a second port.

The hybrid coupler 234 divides each of the signals received via the fourth and first ports into two signals with a phase difference of 90 degrees and outputs the divided signals via the second port.

The signal level control module 36 may be installed on the reflected signal path. The signal level control module 36 may include a splitter 362 for splitting a signal coupled with the signal from the installation path (i.e. the reflected signal) and outputting a split signal and a detector 364 for detecting the signal output from the separator 362 and outputting the detected signal as a control signal for signal level control.

Figure 4:
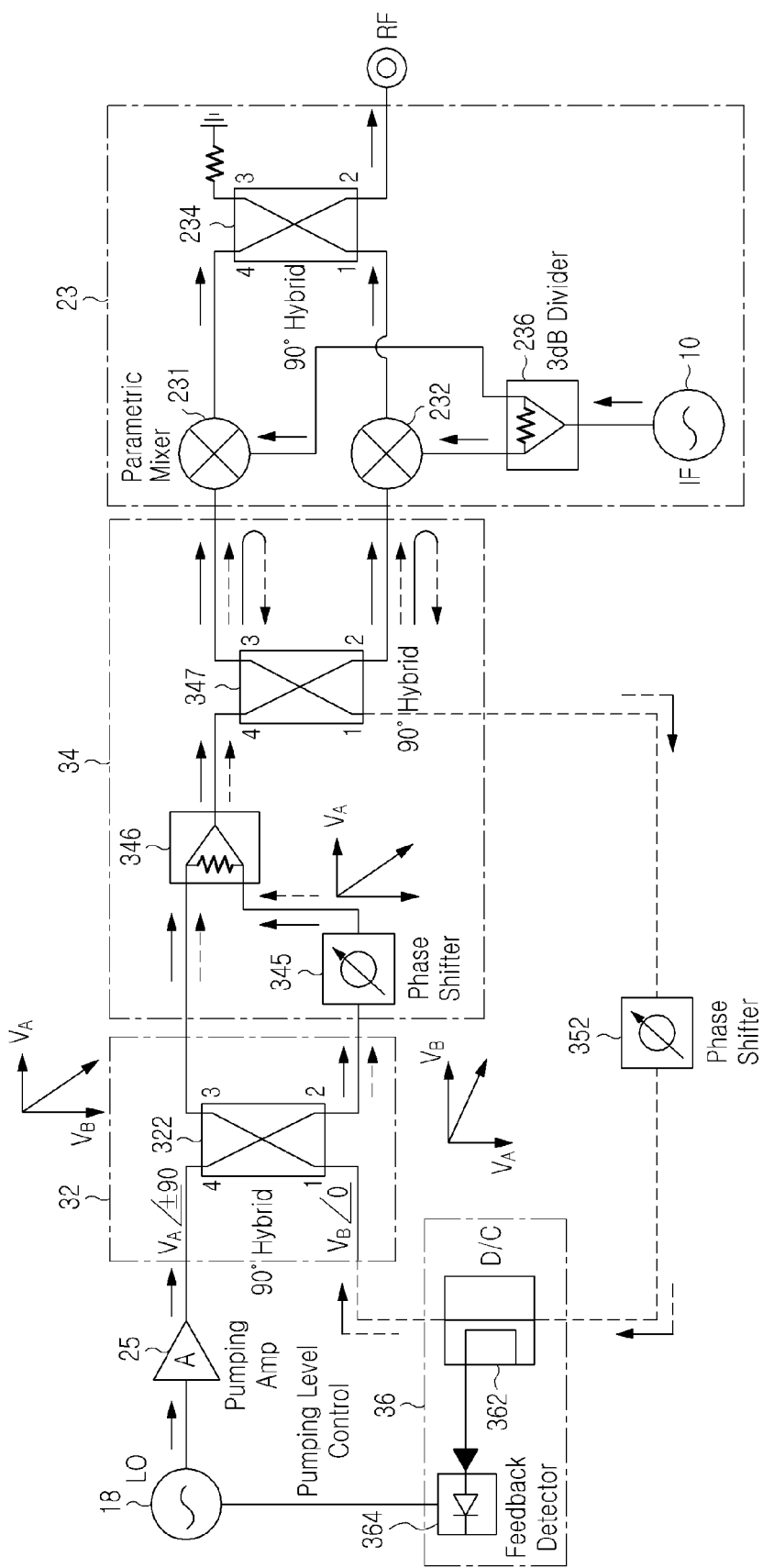
FIG. 4 is a block diagram of an RF transmitter according to another embodiment of the present invention.

FIG. 4 is a block diagram of an RF transmitter according to another embodiment of the present invention. Referring to FIG. 4, the RF transmitter has a similar configuration to the RF transmitter illustrated in FIG. 3 except for the internal structure of the path formation module 34.

In this embodiment, the path formation module 34 includes a combiner 346 for combining two signals received from the second and third ports of the hybrid coupler 322 in the combination/division module 32, and a phase shifter 345 installed on one of the paths of the two signals output from the second and third ports of the hybrid coupler 322, for adjusting the signal path of the installation path in order to match the phases of signals on the two paths. The path formation module 34 further includes a hybrid coupler 347 for dividing a signal received from the combiner 346 into two signals with a phase difference of 90 degrees, outputting the divided signals to the parametric mixer module 23 via second and third ports, combining signals that are reflected from the parametric mixer module 23 and fed back via the second and third ports, and outputting the combined signal as a reflected signal via a first port.

Figure 5:
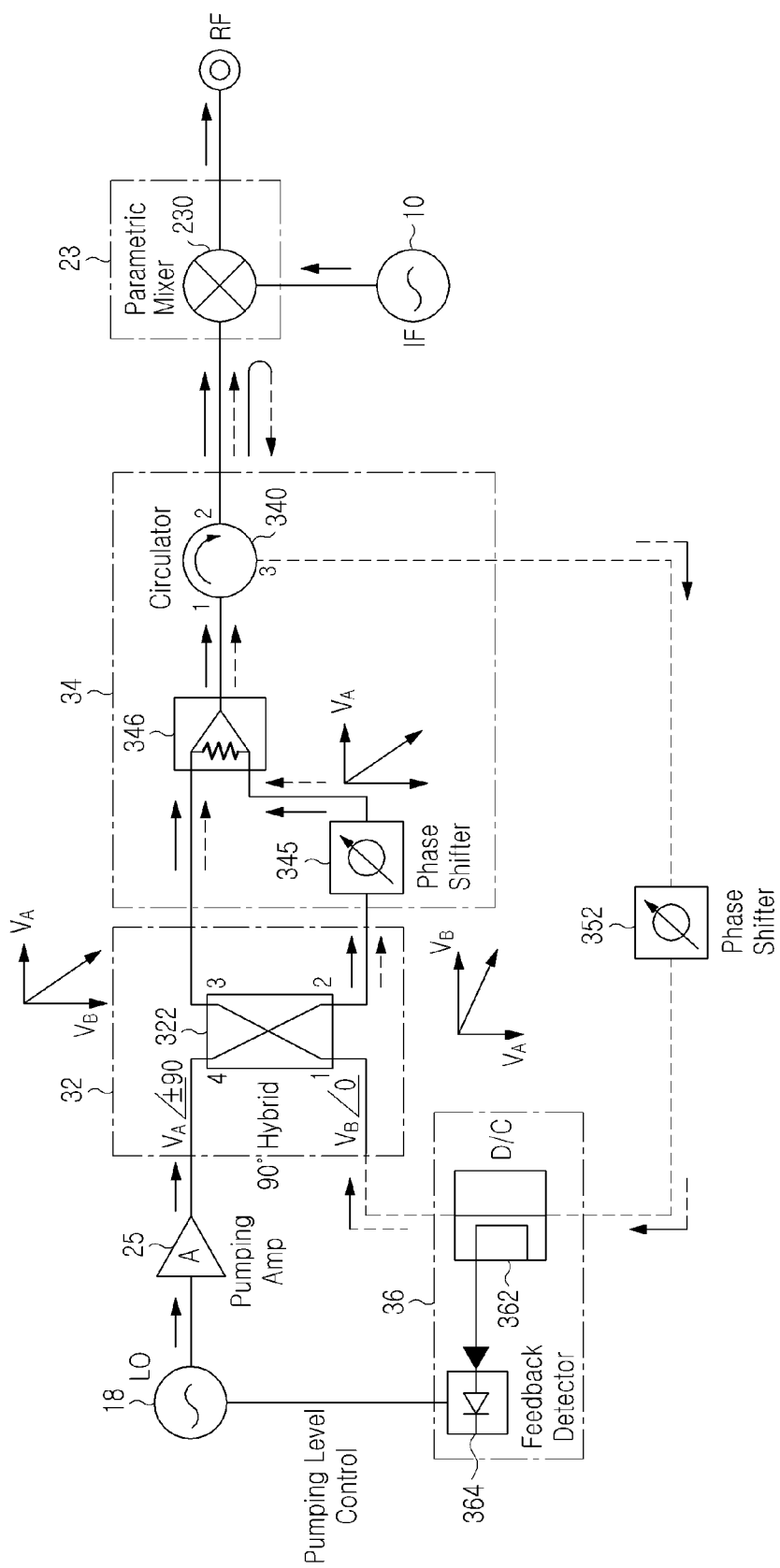
FIG. 5 is a block diagram of an RF transmitter according to a further embodiment of the present invention.

FIG. 5 is a block diagram of an RF transmitter according to a further embodiment of the present invention. Referring to FIG. 5, the RF transmitter has a similar configuration to the RF transmitter illustrated in FIG. 4 except that the parametric mixer module 23 is configured to include the single parametric mixer 230 and the internal structure of the path formation module 34 is different.

As in the RF transmitter illustrated in FIG. 4, the path formation module 34 includes the combiner 346 for combining two signals received from the second and third ports of the hybrid coupler 322 in the combination/division module 32, and the phase shifter 345 installed on one of the paths of the two signals output from the second and third ports of the hybrid coupler 322, for adjusting the signal path of the installation path in order to match the phases of signals on the two paths.

The path formation module 34 further includes a circulator 340 for receiving a signal from the combiner 346 via a first port, outputting the received signal to the parametric mixer 230 of the parametric mixer module 23 via a second port, receiving a signal reflected from the parametric mixer 230 via a second port, and outputting the reflected signal via a third port.

In accordance with the embodiments of the present invention illustrated in FIGS. 3, 4 and 5, a reflected signal out of a pumping signal (i.e. a local oscillation signal amplified by a power amplifier) is returned as a feedback signal in order to reuse the reflected signal, as indicated by dotted arrows. Therefore, efficiency is improved.

While the present invention has been particularly shown and described with reference to certain embodiments thereof, it will be understood by those of ordinary skill in the art that various changes in form and details may be made therein without departing from the spirit and scope of the present invention. For example, while it has been described above that the signal level control module 36 is formed on the reflected signal path between the path formation module 34 and the combination/division module 32, it may be formed on the signal path between the path formation module 34 and the parametric mixer module 23.

In addition, while the hybrid coupler 234 has been described as combining the outputs of the first and second parametric mixers 231 and 232 of the parametric mixer module 23 in FIGS. 3 and 4, the outputs of the first and second parametric mixers 231 and 232 may be combined using a phase shifter for matching the phases of the two output signals and a 3-dB coupler for combining the phase-matched output signals.

Other modifications and changes can be made for real implementation of the present invention.

What is claimed is:

1. A Radio Frequency (RF) transmitter comprising:
a signal source for generating a signal of a predetermined Intermediate Frequency (IF) band;
a local oscillator for generating a signal of a predetermined high frequency band as a carrier signal;
a parametric mixer module for receiving the signals from the signal source and the local oscillator and outputting the received signals as a radio signal for transmission;
a power amplifier installed on a signal path between the local oscillator and the parametric mixer module for amplifying the signal from the local oscillator to a final RF transmission level; and
wherein the signal output from the parametric mixer module is transmitted as the radio signal without additional amplification.

2. The RF transmitter of claim 1, further comprising at least one of:
a first Band Pass Filter (BPF) installed on a signal path between the signal source and the local oscillator, for filtering the signal received from the signal source in a signal band of the signal source;
a second BPF installed on a signal path between the power amplifier and the parametric mixer module, for filtering the signal received from the power amplifier in a frequency band of the local oscillator; and
a third BPF for filtering the signal received from the parametric mixer module in a radio transmission band.

3. The RF transmitter of claim 1, further comprising:
a combination/division module for receiving the signal from the power amplifier and a signal reflected from the parametric mixer module via fourth and first ports, combining and dividing the received signals, and outputting the combined and divided signals via second and third ports; and a path formation module for forming a path to provide the signals received from the second and third ports of the combination/division module to the parametric mixer module and provide the signal reflected from the parametric mixer module to the first port of the combination/division module.

4. The RF transmitter of claim 3, further comprising a phase shifter installed on a reflected signal path between the path formation module and the combination/division module, for adjusting a phase of the reflected signal with respect to a phase of the input signal of the fourth port of the combination/division module.

5. The RF transmitter of claim 3, further comprising a signal level control module for detecting a strength of the reflected signal or a signal provided to the parametric mixer module and controlling an output of the local oscillator or the power amplifier according to the detected signal strength.

6. The RF transmitter of claim 5, wherein the signal level control module comprises:
a splitter installed on the reflected signal path or a signal path leading to the parametric mixer module, for splitting a signal coupled with a signal on the installation path and outputting a split signal; and
a detector for detecting the signal output from the splitter and outputting the detected signal as a control signal for signal level control.

7. The RF transmitter of claim 3, wherein the combination/division module includes a single hybrid coupler, and the hybrid coupler receives the signal from the power amplifier via a fourth port, divides the received signal into two signals with a phase difference of 90 degrees, outputs the divided signals via second and third ports, receives the reflected signal via a first port, divides the reflected signal into two signals with a phase difference of 90 degrees, and outputs the divided reflected signals via the second and third ports.

8. The RF transmitter of claim 3, wherein the path formation module comprises:
a first circulator for receiving the signal from the third port of the combination/division module via a first port, outputting the received signal to the parametric mixer module via a second port, receiving the signal reflected from the parametric mixer module via the second port, and outputting the reflected signal through a third port;
a second circulator for receiving the signal from the second port of the combination/division module via a first port, outputting the received signal to the parametric mixer module via a second port, receiving the signal reflected from the parametric mixer module via the second port, and outputting the reflected signal through a third port;
a combiner for combining the two signals received from the third ports of the first and second circulators; and
a phase shifter installed on one of paths of the two signals output from the third ports of the first and second circulators, for adjusting a phase of a signal on the installation path to match phases of the two signals on the paths.

9. The RF transmitter of claim 8, wherein the parametric mixer module comprises:
a divider for dividing the signal received from the signal source into two signals and outputting the divided two signals;
first and second parametric mixers for receiving the two signals from the path formation module and the divided signals from the divider; and a hybrid coupler for receiving the outputs of the first and second parametric mixers via fourth and first ports, combining the received signals, and outputting the combined signal via a second port.

10. The RF transmitter of claim 3, wherein the path formation module comprises:
a combiner for combining two signals received from the second and third ports of the combination/division module;
a phase shifter installed on one of paths of the two signals output from the third ports of the combination/division module, for adjusting a phase of a signal on the installation path to match phases of the two signals on the paths; and
a hybrid coupler for dividing the output of the combiner into two signals with a phase difference of 90 degrees, outputting the divided signals to the parametric mixer module via second and third ports, combining signals reflected from the parametric mixer module and feedback via second and third ports, and outputting the combined signal as the reflected signal via a first port.

11. The RF transmitter of claim 10, wherein the parametric mixer module comprises:
a divider for dividing the signal received from the signal source into two signals and outputting the divided two signals;
first and second parametric mixers for receiving the two signals from the path formation module and the divided signals from the divider; and
a hybrid coupler for receiving the outputs of the first and second parametric mixers via fourth and first ports, combining the received signals, and outputting the combined signal via a second port.

12. The RF transmitter of claim 3, wherein the path formation module comprises:
a combiner for combining two signals received from the second and third ports of the combination/division module;
a phase shifter installed on one of paths of the two signals output from the third ports of the combination/division module, for adjusting a phase of a signal on the installation path to match phases of the two signals on the paths; and
a circulator for receiving the output of the combiner via a first port, outputting the received signal to the parametric mixer module via a second port, receiving a signal reflected from the parametric mixer module via the second port, and outputting the reflected signal via a third port.

13. A Radio Frequency (RF) transmission method m an RF transmitter, comprising:
generating a signal of a predetermined Intermediate Frequency (IF) band;
generating a local oscillation signal of a predetermined high frequency band as a carrier signal;
amplifying the local oscillation signal to a final RF transmission level;
combining the signal of the predetermined IF band with the amplified local oscillation signal and outputting the combined signal as a radio signal for transmission, using a parametric mixer; and
wherein the signal output from the parametric mixer is transmitted as the radio signal without additional amplification.

14. The RF transmission method of claim 13, wherein feeding back a signal of the amplified local oscillation signal reflected from the parametric mixer into the amplified local oscillation signal.

* * * * *